United States Patent
Zhang et al.

(10) Patent No.: US 12,356,904 B1
(45) Date of Patent: Jul. 15, 2025

(54) INTELLIGENT IRRIGATION CONTROL METHOD FOR RICE FIELDS BASED ON CLOUD SERVICE PLATFORM AND SYSTEM THEREOF

(71) Applicant: INSTITUTE OF SOIL SCIENCE, CHINESE ACADEMY OF SCIENCES, Jiangsu (CN)

(72) Inventors: Guangbin Zhang, Jiangsu (CN); Xiaoyuan Yan, Jiangsu (CN); Wei Zhou, Jiangsu (CN); Jing Ma, Jiangsu (CN); Hua Xu, Jiangsu (CN)

(73) Assignee: INSTITUTE OF SOIL SCIENCE, CHINESE ACADEMY OF SCIENCES, Nanjing (CN)

( * ) Notice: Subject to any disclaimer, the term of this patent is extended or adjusted under 35 U.S.C. 154(b) by 0 days.

(21) Appl. No.: 19/015,566

(22) Filed: Jan. 9, 2025

(30) Foreign Application Priority Data

Feb. 20, 2024 (CN) .......................... 202410187295.1

(51) Int. Cl.
*A01G 25/16* (2006.01)
*G05B 13/04* (2006.01)

(52) U.S. Cl.
CPC .......... *A01G 25/167* (2013.01); *G05B 13/042* (2013.01)

(58) Field of Classification Search
CPC .... A01G 25/16; A01G 25/162; A01G 25/165; A01G 25/167; G05B 13/042; G05B 2219/2625; Y10T 137/1866
See application file for complete search history.

(56) References Cited

U.S. PATENT DOCUMENTS

| | | |
|---|---|---|
| 9,886,016 B2 * | 2/2018 | Bermudez Rodriguez ................. G05B 15/02 |
| 2016/0202679 A1 | 7/2016 | Bermudez Rodriguez et al. |
| 2021/0127603 A1 * | 5/2021 | Pryor ..................... A01G 25/16 |
| 2021/0289723 A1 * | 9/2021 | Mewes .................... G06F 30/20 |
| 2024/0070527 A1 * | 2/2024 | Mukherjee ............ G06N 20/00 |

FOREIGN PATENT DOCUMENTS

| | | |
|---|---|---|
| CA | 2987319 A1 | 12/2016 |
| CN | 103814795 A | 5/2014 |
| CN | 106688827 A | 5/2017 |
| TW | I709938 B | 11/2020 |

* cited by examiner

*Primary Examiner* — M. N. Von Buhr

(57) ABSTRACT

Provided is an intelligent irrigation control method for rice fields based on a cloud service platform and a system thereof. Constructing a planting condition data set and a condition coefficient, monitoring the current water supply environment of crops, and constructing a water supply coefficient. If the water supply coefficient is lower than the water supply threshold, based on the current growth data of crops, a plurality of corresponding irrigation strategies are matched from the pre-constructed crop irrigation knowledge graph, and the target strategy is selected from a plurality of irrigation strategies; constructing an irrigation observation coefficient set, and constructing irrigation coefficient. If the irrigation coefficient is lower than the efficiency threshold, use the trained strategy optimization model to optimize the target strategy, and control the irrigation coefficient based on the optimized target strategy to complete the irrigation of crops in the irrigation area.

5 Claims, 2 Drawing Sheets periodically monitoring crop planting condition in each sub-area of an irrigation area, constructing a planting condition data set, constructing a condition coefficient of crop planting based on the planting condition data set, and issuing a warning instruction if the condition coefficient of crop planting exceeds a state threshold

after receiving the warning instruction, monitoring a current water supply environment of crops and constructing a water supply coefficient, if the water supply coefficient is lower than a water supply threshold, installing an irrigation system in a planting area, and obtaining a crop growth digital twin model after training

based on current growth data of crops, matching a plurality of irrigation strategies correspondingly from a pre-constructed crop irrigation knowledge graph, and selecting a target strategy from the plurality of irrigation strategies through a growth coefficient constructed

after implementing the target strategy in the irrigation area, periodically obtaining the water supply coefficient and the growth coefficient of crops during an observation period, then constructing an irrigation observation coefficient set, constructing an irrigation coefficient based on the irrigation observation coefficient set, if the irrigation coefficient is lower than an efficiency threshold, issuing an optimization instruction

receiving an optimization instruction, using a trained strategy optimization model to optimize the target strategy to obtain an optimized target strategy, and controlling the irrigation coefficient based on the optimized target strategy to irrigate crops in the irrigation area

FIG. 1

INTELLIGENT IRRIGATION CONTROL METHOD FOR RICE FIELDS BASED ON CLOUD SERVICE PLATFORM AND SYSTEM THEREOF

CROSS-REFERENCE TO RELATED APPLICATIONS

This application claims to the benefit of priority from Chinese Application No. 202410187295.1 with a filing date of Feb. 20, 2024. The content of the aforementioned applications, including any intervening amendments thereto, are incorporated herein by reference.

TECHNICAL FIELD

The present disclosure relates to the technical field of irrigation control, in particular to an intelligent irrigation control method for rice fields based on a cloud service platform and a system thereof.

BACKGROUND

Precision irrigation is a modern agricultural technology that focuses on providing precise water supply based on the actual needs of crops, in order to achieve the goals of conserving water resources, increasing yield, and ensuring quality. The application of this technology needs the help of advanced agricultural equipment and information technology, such as sensors, satellite remote sensing, unmanned aerial vehicles, etc., to monitor the growth status of crops and soil conditions in real-time, and adjust an irrigation plan based on monitoring data. Precision irrigation is one of the important directions for the development of modern agriculture, which plays a crucial role in increasing agricultural yield, reducing production costs, and protecting the ecological environment. In order to further improve the reliability of precision irrigation, the existing irrigation system has also been connected to cloud platform services.

In the Chinese patent application with publication number CN103814795A, a method for irrigating farmland using the system is disclosed, which includes a pumping station, a field ditch, an automatic control device for farmland irrigation, and a soil moisture monitoring device for rice fields. The soil moisture monitoring device for rice fields can control the operation of the water pump on/off controller based on the output signal of the liquid level meter, the field ditch is supplied with water by a lifting pump, and the automatic control device for farmland irrigation automatically pours irrigation water into the farmland or cuts off irrigation according to the water level of the farmland. The advantages of the disclosure are simple in structure and convenient for maintenance. It solves the problem that it is difficult to popularize the new technology of rice planting with shallow wet irrigation, and realizes the precision irrigation of farmland water conservancy, saving water and increasing efficiency.

In combination with the above applications and existing technologies, there are still the following problems in precision irrigation of rice fields: when an irrigation system is installed in the planting area and it is determined that the crops have entered a water shortage state, the irrigation system is activated, which can timely and accurately irrigate the crops in the irrigation area; in the existing intelligent irrigation control methods for rice fields, although the growth cycle of crops and future weather conditions are taken into account, if the planting conditions in the irrigation area are poor, such as insufficient rainfall, the air moisture content and soil moisture content are lower than expected, under these conditions, if the crops are not irrigated to replenish water in advance, and the crops are still irrigated according to the predetermined irrigation strategy without adjusting the irrigation strategy, it may make it difficult for the current precise irrigation to achieve the expected irrigation effect, thereby delaying the growth of crops.

Therefore, the present disclosure provides an intelligent irrigation control method for rice fields based on a cloud service platform and a system thereof.

SUMMARY

(1) Technical Problems Solved

In view of the shortcomings of the prior art, the present disclosure provides an intelligent irrigation control method for rice fields based on a cloud service platform and a system thereof. By monitoring the current water supply environment of crops and constructing a water supply coefficient, if the water supply coefficient is lower than the water supply threshold, a plurality of irrigation strategies correspondingly are matched from the crop irrigation knowledge graph pre-constructed based on the current growth data of crops, and the target strategy is selected from a plurality of irrigation strategies through the constructed growth coefficient; an irrigation observation coefficient set is constructed, and an irrigation coefficient is constructed from the irrigation observation coefficient set, if the irrigation coefficient is lower than the efficiency threshold, use the trained strategy optimization model to optimize the target strategy, and control the irrigation coefficient based on the optimized target strategy to complete the irrigation of crops in the irrigation area. According to the growth coefficient of crops, the reliability of irrigation strategies is verified and screened, thus solving the technical problems mentioned in the background.

(2) Technical Solution

To achieve the above objectives, the present disclosure is achieved through the following technical solution: an intelligent irrigation control method for rice fields based on a cloud service platform includes: periodically monitoring the crop planting conditions in each sub-area of an irrigation area, constructing a planting condition data set, constructing a condition coefficient $Fps$ of crop planting based on the planting condition data set, and issuing a warning instruction if the condition coefficient $Fps$ of crop planting exceeds a state threshold;

After receiving the warning instruction, monitoring a current water supply environment of crops and constructing a water supply coefficient $Hps$, if the water supply coefficient is lower than a water supply threshold, installing an irrigation system in the planting area, and obtaining a digital twin model of crop growth after training;

Based on the current growth data of crops, matching a plurality of irrigation strategies correspondingly from a pre-constructed crop irrigation knowledge graph, and selecting a target strategy from the plurality of irrigation strategies through a growth coefficient $Bps$ constructed;

After implementing the target strategy in the irrigation area, periodically obtaining the water supply coefficient $Hps$ and the growth coefficient $Bps$ of crops during an observation period, then constructing an irrigation observation coefficient set, constructing an irrigation coefficient $Pes$ based on the irrigation observation coefficient set, if the irrigation coefficient Pes is lower than an efficiency threshold, issuing an optimization instruction, wherein constructing the irrigation coefficient Pes based on the irrigation observation coefficient set, as follows:

$$Pes = k_1 * \max|Hps_i - Bps_i| + k_2 * \frac{1}{n} * \sum_{i=1}^{n} |Hps_i - Bps_i|;$$

Wherein, $k_2$ and $k_1$ are weights, $0 \leq k_1 \leq 1$, $0 \leq k_2 \leq 1$, and $k_1 + k_2 = 1$; $Bps_i$ is the i-th growth coefficient, $Hps_i$ is the i-th water supply coefficient, i=1, 2, ... n, n is the number of observation nodes;

Receiving an optimization instruction, using a strategy optimization model after training to optimize the target strategy, and controlling the irrigation coefficient based on the target strategy optimized to irrigate crops in the irrigation area.

Further, dividing the irrigation area into a plurality of sub-areas, selecting an installation point within each sub-area, installing a detection unit at each installation point, and establishing a planting condition monitoring system within the irrigation area; dividing crop growth into a plurality of growth cycles, and setting up a plurality of monitoring nodes spaced equally within a current growth cycle of crops; at each monitoring node, using the planting condition monitoring system to monitor the planting conditions in the sub-area, and summarizing the collected monitoring data to construct a planting condition data set.

Further, obtaining the rainfall Rv, the temperature Rt, and the sunshine duration Rg in the irrigation area at each monitoring node from the planting condition data set, performing linear normalization on the above three, mapping the corresponding data values to an interval [0, 1], and constructing the condition coefficient Fps of crop planting according to the following formula:

$$Fps = \alpha * \frac{Rv_{avg}(k-1)}{\sum_{i=1}^{k}(Rv_i - \overline{Rv})^2} + \beta * \frac{Rt_{avg}(k-1)}{\sum_{i=1}^{k}(Rt_i - \overline{Rt})^2} + \gamma * \frac{Rg_{avg}(k-1)}{\sum_{i=1}^{k}(Rg_i - \overline{Rg})^2};$$

Weight coefficients: $0 \leq \beta \leq 1$, $0 \leq \alpha \leq 1$, $0 \leq \gamma \leq 1$, and $\alpha + \beta + \gamma = 1$, i=1, 2, d, k, k is the number of monitoring nodes, $Rv_{avg}$ is an average value of rainfall, $\overline{Rv}$ is a qualified standard value for rainfall, $Rt_{avg}$ is an average value of temperature, $\overline{Rt}$ is the qualified standard value for temperature, $Rg_{avg}$ is an average value of sunshine duration, and $\overline{Rg}$ is a qualified standard value for sunshine duration.

Further, setting up the detection point in each sub-area to monitor the air humidity and the soil moisture content in each sub-area, and summarizing the monitoring data to construct a water supply condition set; constructing the water supply coefficient Hps based on the water supply condition set in the following way: performing linear normalization on air humidity Rp and soil moisture content Tp, and mapping the corresponding data values to an interval [0, 1] according to the following formula:

$$Hps = 1 - \rho * \ln\left(\frac{1}{1+Rp^2}+1\right) - \zeta * \ln\left(\frac{1}{1+Tp^2}+1\right);$$

Weight coefficient: $0 \leq \rho \leq 1$, $0 \leq \zeta \leq 1$; if the water supply coefficient Hps is lower than the water supply threshold, installing an irrigation system in the planting area.

Further, after determining a type and a current growth stage of crops, taking crop irrigation and related keywords as search terms to construct a graph data set through deep search, and generating a crop irrigation knowledge graph after completing the entity relationship construction.

Performing feature recognition on crops data and planting status data of crops to obtain data features correspondingly; after determining the irrigation requirements of crops, based on a correspondence between the data features and the irrigation strategies of crops, using a trained matching model to match a plurality of irrigation strategies correspondingly from the crop irrigation knowledge graph.

Further, obtaining rainfall prediction information and combining it with the irrigation strategies obtained as input, using a crop growth digital twin model to predict the growth status of crops, obtaining predicted growth data correspondingly; summarizing the predicted growth data to construct a predicted data set; constructing the growth coefficient Bps of crops based on the predicted data set, marking each of irrigation strategies based on the growth coefficient Bps obtained, and taking an irrigation strategy with the highest growth coefficient Bps as the target strategy, and the irrigation strategy with a second-highest growth coefficient Bps as the backup strategy.

Further, after obtaining the target strategy correspondingly, executing the target strategy within the current growth cycle of the crops, and after executing the target strategy, setting an observation period and there is a plurality of observation nodes within the observation period; monitoring the planting conditions before and after irrigation in the irrigation area at each of the observation nodes, and constructing the water supply coefficient Hps at each of the observation nodes; selecting a plurality of crop samples in each sub-area and constructing the growth coefficient Bps of crops correspondingly after measurement; summarizing the water supply coefficient Hps and the growth coefficient Bps of crops at each of observation nodes to construct an irrigation observation coefficient set.

Further, constructing and obtaining a trained strategy optimization model using linear programming algorithm; using the trained strategy optimization model and combining with the current growth status data, the growth environment data, and weather prediction data of crops to optimize the target strategy to obtain an optimized irrigation strategy; in the next observation cycle, executing an optimized irrigation plan within the irrigation area to irrigate the crops in the irrigation area.

Further, taking the optimized irrigation strategy as an input, using the crop growth digital twin model after training to predict the growth status of crops, and constructing the growth coefficient Bps of crops based on the predicted values, if the growth coefficient Bps of crops obtained is lower than a progress threshold, issuing an alarm instruction.

An intelligent irrigation control system for rice fields based on a cloud service platform, including:
- a warning unit, configured to periodically monitor the crop planting condition in each sub-area of the irrigation area to construct a planting condition data set, and construct the crop planting condition coefficient Fps based on the planting condition data set. If the condition coefficient Fps of crop planting exceeds the state threshold, issuing a warning instruction;
- an installation unit, wherein the installation unit monitors the current water supply environment of crops and constructs a water supply coefficient Hps after receiving warning instructions, if the water supply coefficient Hps is lower than the water supply threshold, installing an irrigation system in the planting area and training to obtain a crop growth digital twin model;

a screening unit, wherein the screening unit matches a plurality of irrigation strategies correspondingly from the pre-constructed crop irrigation knowledge graph based on the current growth data of crops, and selects a target strategy from the plurality of irrigation strategies through the constructed growth coefficient Bps;

an analysis unit, wherein the analysis unit periodically obtains the water supply coefficient Hps and the growth coefficient Bps of crops during the observation period after implementing the target strategy in the irrigation area, then constructs an irrigation observation coefficient set, and constructs the irrigation coefficient Pes based on the irrigation observation coefficient set, if the irrigation coefficient Pes is lower than the efficiency threshold, issuing an optimization instruction;

an optimization unit, configured to receive the optimization instruction, use the strategy optimization model after training to optimize the target strategy, and control the irrigation coefficient based on the target strategy after optimizing to complete the irrigation of crops in the irrigation area.

(3) Advantageous Effects

The present disclosure provides an intelligent irrigation control method for rice fields based on a cloud service platform and a system thereof, which has the following advantageous effects:

1. Air humidity and soil moisture content are used as representative parameters to construct the water supply coefficient Hps, based on the water supply coefficient Hps, the water supply condition in the irrigation area can be determined. By setting up the monitoring system and the irrigation system in the irrigation area, precise irrigation of crops can be achieved through the combination of the two, which can save water and ensure the growth status of crops.

2. By pre-constructing a crop irrigation knowledge graph, corresponding irrigation strategies can be matched for crops in the current state. By matching irrigation strategies to specific crops, irrigation suggestions can be provided based on the growth of crops, which makes the crop process more targeted and intelligent, thus fully ensuring the growth of crops. By using a crop growth digital twin model to predict the growth status of crops, and then constructing the growth coefficient Bps of crops, the reliability of irrigation strategies is verified and screened based on the growth coefficient Bps of crops, further improving the growth status of crops.

3. By monitoring the growth environment and status of crops after irrigation to obtain the water supply coefficient Hps and the growth coefficient Bps of crops at each observation node, and based on this, an irrigation coefficient Pes is constructed, which can be used to determine the current irrigation efficiency and effect. If the irrigation efficiency reaches the expected level, it indicates that the current irrigation strategy is feasible. When it is necessary to irrigate crops in the irrigation area, precise irrigation of crops can be achieved by controlling the irrigation coefficient. Otherwise, the given irrigation strategy needs to be optimized and improved to enhance the subsequent irrigation effect.

4. After training to obtain a strategy optimization model, optimizing the current irrigation strategy and obtaining the optimized irrigation strategy. Then, in the next cycle, irrigating crops based on the new irrigation strategy to improve and enhance the subsequent irrigation efficiency. The trained crop growth digital twin model is used to predict the growth status of crops, if the growth status of crops does not reach expectations, in addition to precision irrigation, improvements to crop growth from other perspectives are also needed.

BRIEF DESCRIPTION OF THE DRAWINGS

FIG. 1 is a flow diagram of the intelligent irrigation control method for rice fields according to the present disclosure;

DETAILED DESCRIPTION OF THE EMBODIMENTS

Figure 2:
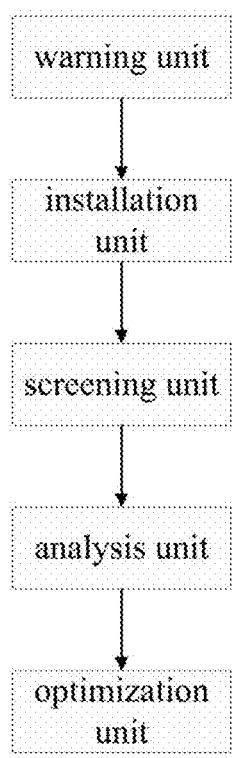
FIG. 2 is a schematic structure diagram of the intelligent irrigation control system for rice fields according to the present disclosure.

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments of the present disclosure, all other embodiments obtained by the ordinary skilled in the art without creative labor are within the scope of the present disclosure.

Please refer to FIG. 1, the present disclosure provides an intelligent irrigation control method for rice fields based on a cloud service platform, including:

Step 1: periodically monitoring the crop planting conditions in each sub-area of the irrigation area, constructing a planting condition data set, constructing a condition coefficient Fps of crop planting from the planting condition data set, and issuing a warning instruction if the condition coefficient Fps of crop planting exceeds a state threshold.

The first step includes the following:

Step 101: after determining the crop planting area that needs irrigation, using it as the irrigation area, dividing the irrigation area into a plurality of sub-areas, and numbering each sub-area separately; after completing crop planting in each sub-area, selecting an installation point in each sub-area, establishing a planting condition monitoring system of the irrigation area in the detect units at each installation point, including soil moisture sensors and other meteorological sensors to measure soil moisture, temperature, rainfall, and other data;

Step 102: dividing the crop growth into a plurality of growth cycles according to the growth cycle of the crop, and setting a plurality of equally spaced monitoring nodes within the current growth cycle of the crop; monitoring the planting conditions in the sub-area by a planting condition monitoring system at each monitoring node, and summarizing the monitoring collected to construct a planting condition data set;

Step 103: obtaining the rainfall Rv, the temperature Rt, and the sunshine duration Rg in the irrigation area of each monitoring node from the planting condition data set. After performing linear normalization on the above three, mapping the corresponding data values to the interval [0, 1], and constructing the conditional coefficient Fps of crop planting according to the following formula:

$$Fps = \alpha * \frac{Rv_{avg}(k-1)}{\sum_{i=1}^{k}(Rv_i - \overline{Rv})^2} + \beta * \frac{Rt_{avg}(k-1)}{\sum_{i=1}^{k}(Rt_i - \overline{Rt})^2} + \gamma * \frac{Rg_{avg}(k-1)}{\sum_{i=1}^{k}(Rg_i - \overline{Rg})^2};$$

Wherein, the weight coefficients are: $0 \leq \beta \leq 1$, $0 \leq \alpha \leq 1$, $0 \leq \gamma \leq 1$, and $\alpha+\beta+\gamma=1$, i=1, 2, d, k. k is the number of monitoring nodes, $Rv_{avg}$ is the average value of rainfall, $\overline{Rv}$ is the qualified standard value for rainfall, and $Rv_i$ is the rainfall on the i-th monitoring node; $Rt_{avg}$ is the average value of temperature, $\overline{Rt}$ is the qualified standard value for temperature, and $Rt_i$ is the temperature at the i-th monitoring node; $Rg_{avg}$ is the average value of sunshine duration, $\overline{Rg}$ is the qualified standard value for sunshine duration, and $Rg_i$ is the sunshine duration at the i-th monitoring node.

Pre-setting the state threshold in combination with historical data and management expectation of crop growth environment; if the conditional coefficient of crop planting exceeds the state threshold, it indicates that there is a certain abnormality in the growth status of the crop during the current growth cycle, which needs to be dealt with in a timely manner. Otherwise, the growth status of the crop will be affected to a certain extent, and warning instructions will be issued.

When using, combining the content from step 101 to step 103:

After the crops enter the growth state, monitoring the planting conditions of the crops in the irrigation area, and then constructing the crop planting condition coefficient Fps. Based on the current crop planting condition coefficient Fps, it is possible to judge whether the planting area is suitable for crop growth. If it is not suitable, adjustments need to be made to the current growth environment of the crops. When the rainfall in the irrigation area is insufficient or the corresponding growth status is difficult to obtain the corresponding water supply, an irrigation system needs to be installed.

By installing irrigation systems in the planting area and activating them when it is determined that crops have entered a water shortage state, precise irrigation of crops in the irrigation area can be carried out in a timely manner; in the existing intelligent irrigation control methods for rice fields, although the growth cycle of crops and future weather conditions are taken into account, if the planting conditions in the irrigation area are poor, such as insufficient rainfall, and the air and soil moisture contents are lower than expected, under these conditions, if the crops are not irrigated to replenish water in advance, and the crops are still irrigated according to the predetermined irrigation strategy without adjusting the irrigation strategy, it may make it difficult for the current precise irrigation to achieve the expected irrigation effect, thereby delaying the growth of crops.

Step 2: after receiving the warning instruction, monitoring the current water supply environment of the crop and constructing a water supply coefficient Hps. If the water supply coefficient Hps is lower than the water supply threshold, installing an irrigation system in the planting area and obtaining a digital twin model of crop growth after training.

The second step includes the following:

Step 201: setting up detection sites in each sub-area to monitor the air humidity and soil moisture content in each sub-area, and summarizing the monitoring data to construct a water supply condition set; constructing the water supply coefficient Hps from the water supply condition set, as follows: performing linear normalization on the air humidity Rp and soil moisture content Tp, and mapping the corresponding data values to the interval [0, 1] according to the following formula:

$$Hps = 1 - \rho * \ln\left(\frac{1}{1+Rp^2} + 1\right) - \zeta * \ln\left(\frac{1}{1+Tp^2} + 1\right);$$

Weight coefficient: $0 \leq \rho \leq 1$, $0 \leq \zeta \leq 1$. The weight coefficient can be set by the user or obtained by referring to the analytic hierarchy process;

Step 202: pre-constructing water supply threshold according to historical data and management expectations of crop planting; if the water supply coefficient Hps is lower than the water supply threshold, it indicates that there is a shortage of water in the irrigation area, and it is necessary to irrigate the crops in the irrigation area. At this time, issuing installation instructions to the outside; after receiving installation instructions, installing irrigation systems in the planting area, including: selecting sensors, such as soil moisture sensors, meteorological sensors, flow meters, etc; control devices, such as solenoid valves, water pumps, etc;

Step 203: determining the type, planting time, and current specifications data of the crop, summarizing the relevant data of the crop with the planting status data, extracting some data from the summarized data as sample data, constructing an initial model using a convolutional neural network, and using the sample data for training and testing to obtain a crop growth digital twin model after training.

When using, please refer to step 201 to step 203:

Taking the air humidity and the soil moisture content as representative parameters to construct the water supply coefficient Hps. Judging the water supply conditions in the irrigation area according to the water supply coefficient Hps. If crops cannot obtain sufficient water supply in the irrigation area, the growth status of the crops will be affected to some extent; at this time, by setting up monitoring systems and irrigation systems within the irrigation area, the combination of the two can achieve precise irrigation of crops, play a water-saving role, and ensure the growth status of crops.

Step 3: based on the current growth data of the crop, matching a plurality of corresponding irrigation strategies from the pre-constructed crop irrigation knowledge graph, and selecting the target strategy from a plurality of irrigation strategies by the constructed growth coefficient Bps.

The third step includes the following:

Step 301: after determining the type and current growth stage of the crop, using crop irrigation and related words as search terms, constructing a graph data set through deep search, and generating a crop irrigation knowledge graph after completing the entity relationship construction;

Performing feature recognition on crop data and its planting status data to obtain corresponding data features; after determining the irrigation requirements of crops, based on the correspondence between data features and crop irrigation strategies, matching a plurality of corresponding irrigation strategies from the crop irrigation knowledge graph by using the trained matching model;

Step 302: obtaining the rainfall forecast information, and combining with the irrigation strategies obtained as input, predicting the growth state of crops with the crop growth digital twin model to obtain the corresponding forecast growth data, and summarizing the forecast growth data to build a forecast data set; constructing the growth coefficient Bps of crops from the forecast data set, and the specific way is as follows:

Obtaining the plant height Zg and the average leaf area Yg of each crop sample, after performing linear normalization on the above two, mapping the corresponding data values to the interval [0, 1] according to the following formula:

$$Bps = \frac{F_1}{Zg_{avg} * p} \sum\nolimits_{i=1}^{p} |Zg_i - \overline{Zg}| + \frac{F_2}{Yg_{avg} * p} \sum\nolimits_{i=1}^{p} |Yg_i - \overline{Yg}|;$$

Wherein, i=1, 2, d, p, and p is the number of crop samples; weight coefficient: $0 \leq F_1 \leq 1$, $0 \leq F_2 \leq 1$ and $F_2 + F = 1$; $Zg_{avg}$ is the average value of plant height, $\overline{Zg}$ is the qualified standard value for plant height, and $Zg_i$ is the plant height of the i-th crop sample; $Yg_{avg}$ is the average value of leaf area, $\overline{Yg}$ is the qualified standard value for leaf area, and $Yg_i$ is the leaf area of the i-th crop sample.

Marking each irrigation strategy based on the obtained growth coefficient Bps, and taking the irrigation strategy with the highest growth coefficient Bps as the target strategy, and the second as the backup strategy.

When using, combining the step 301 to the step 302:

After the crops enter the growth state, monitoring the growth status and the environmental conditions of the crops, and matching the corresponding irrigation strategy for the crops in the current state with a pre-constructed crop irrigation knowledge graph. At this time, by matching the irrigation strategy for the crops, irrigation suggestions can be given according to the growth of the crops, making the crop process more targeted and intelligent, so as to fully guarantee the growth of crops.

Further, when multiple strategies are provided, the crop growth digital twin model is used to predict the growth status of crops, and then the growth coefficient Bps of crops is constructed. Based on the growth coefficient Bps of crops, the reliability of irrigation strategies can be verified and screened, further improving the growth status of crops.

Step 4: after implementing the target strategy in the irrigation area, periodically obtaining the water supply coefficient Hps and the growth coefficient Bps of crops during the observation period, and then constructing an irrigation observation coefficient set. Constructing the irrigation coefficient Pes from the irrigation observation coefficient set. If the irrigation coefficient Pes is lower than the efficiency threshold, issuing an optimization instruction;

Step four includes the following:

Step 401: after obtaining the corresponding target strategy, executing the target strategy within the current growth cycle of the crop, and after executing the target strategy, setting the observation period so that there are a plurality of observation nodes within the observation period;

Monitoring the planting conditions before and after irrigation in the irrigation area at each observation node, and constructing the water supply coefficient Hps at each observation node; selecting a plurality of crop samples in each sub-area at each observation node, and constructing corresponding growth coefficients Bps of crop after measurement; summarizing the water supply coefficient Hps and the growth coefficient Bps of crops at each observation node to construct an irrigation observation coefficient set.

Step 402: constructing the irrigation coefficient Pes from the irrigation observation coefficient set, the specific method is as follows:

$$Pes = k_1 * \max|Hps_i - Bps_i| + k_2 * \frac{1}{n} * \sum\nolimits_{i=1}^{n} |Hps_i - Bps_i|;$$

Wherein, $k_2$ and $k_1$ are weights, $0 \leq k_1 \leq 1$, $0 \leq k_2 \leq 1$, and $k_1 + k_2 = 1$, $Bps_i$ is the i-th growth coefficient, $Hps_i$ is the i-th water supply coefficient, i=1, 2, ... n, and n is the number of observation nodes.

Constructing an efficiency threshold in advance based on historical data and management expectations for irrigation; if the obtained irrigation coefficient Pes is lower than the efficiency threshold, it indicates that the irrigation during the current observation period has not reached the expected level, and the crop growth status has not reached a better level. Therefore, in the next observation period, it is necessary to adjust the current irrigation strategy and issue optimization instructions to the outside.

When using, combining the content from the step 401 to the step 402:

After obtaining the target strategy and executing it within the irrigation area, monitoring the growth environment and status of the crops after irrigation, and obtaining the water supply coefficient Hps and the growth coefficient Bps of crops at each observation node; constructing an irrigation coefficient Pes based on this, which can be used to judge the current irrigation efficiency and effect. If the irrigation efficiency reaches the expected level, it indicates that the current irrigation strategy is feasible. When it is necessary to irrigate crops in the irrigation area, precise irrigation of crops can be achieved by controlling the irrigation coefficient. Otherwise, the given irrigation strategy needs to be optimized and improved to enhance the subsequent irrigation effect.

Step 5: receiving optimization instructions, taking the trained strategy optimization model to optimize the target strategy, and controlling the irrigation coefficient based on the optimized target strategy to complete the irrigation of crops in the irrigation area.

Step five includes the following:

Step 501: collecting current growth status data, growth environment data and weather forecast data of crops, and extracting some data from the collected data as sample data; constructing an initial model by linear programming algorithm, training and testing the initial model with sample data, and obtaining the trained strategy optimization model;

Step 502: using the trained strategy optimization model, combined with the current growth status data, growth environment data, and weather prediction data of crops, optimizing the target strategy and obtaining the optimized irrigation strategy; in the next observation cycle, executing the irrigation plan optimized within the irrigation area and irrigating the crops in the irrigation area;

When in use, after training to obtain a strategy optimization model, optimizing the current irrigation strategy and obtaining the optimized irrigation strategy. Then, in the next cycle, irrigating crops according to the new irrigation strategy, thereby improving and enhancing the subsequent irrigation efficiency;

Step 503: taking the optimized irrigation strategy as input, using the trained crop growth digital twin model to predict the growth status of crops, constructing the growth coefficient Bps of crops from the predicted values, and pre-constructing a progress threshold by combining with historical data and the expectation of crop growth progress; if the growth coefficient Bps of the crop obtained is lower than the progress threshold, it indicates that the irrigation amount during the current observation period has not reached the expected level, which has a negative impact on the growth of the crop. At this time, issuing an alarm instruction to the outside.

When in use, combining the step 501 to the step 503:

After implementing the optimized irrigation strategy, using the trained crop growth digital twin model to predict the growth status of crops. If the growth status of crops does not reach the expected level, it indicates that other factors interfere with the growth status of crops besides irrigation. Therefore, in addition to precision irrigation of crops, it is necessary to improve crop growth from other perspectives.

Please refer to FIG. 2, the present disclosure provides an intelligent irrigation control system for rice fields based on a cloud service platform, including a warning unit, an installation unit, a screening unit, an analysis unit, and an optimization unit.

The warning unit periodically monitors the crop planting conditions in each sub-area of the irrigation area, constructs a planting condition data set, and constructs the crop planting condition coefficient Fps from the planting condition data set. If the crop planting condition coefficient Fps exceeds the state threshold, a warning instruction is issued;

The installation unit monitors the current water supply environment of crops and constructs a water supply coefficient Hps after receiving warning instructions. If the water supply coefficient Hps is lower than the water supply threshold, an irrigation system is installed in the planting area and a crop growth digital twin model is trained;

Based on the current growth data of crops, the screening unit matches a plurality of corresponding irrigation strategies from the pre-constructed crop irrigation knowledge graph, and selects the target strategy from a plurality of irrigation strategies by the constructed growth coefficient Bps;

After implementing the target strategy in the irrigation area, the analysis unit periodically obtains the water supply coefficient Hps and crop growth coefficient Bps during the observation period, then constructs an irrigation observation coefficient set, and constructs the irrigation coefficient Pes from the irrigation observation coefficient set. If the irrigation coefficient Pes is lower than the efficiency threshold, optimization instructions are issued.

The optimized unit receives optimization instructions, uses the trained strategy optimization model to optimize the target strategy, and controls the irrigation coefficient based on the optimized target strategy to complete the irrigation of crops in the irrigation area.

It should be noted that the analytic hierarchy process is a qualitative and quantitative analysis method that can decompose complex problems into multiple levels. Comparing the importance of factors at each level can help decision-makers make decisions on complex problems and determine the final decision plan. In this process, the analytic hierarchy process can be used to determine the weight coefficients of these indicators; The steps of the analytic hierarchy process are as follows:

Identify the problem: firstly, it is necessary to clarify the decision-making problem, determining the decision-making objectives and alternative solutions;

Establish a hierarchical structure model: based on the nature of the problem and decision objectives, decomposing the problem into different levels, usually including the objective layer, criterion layer, and solution layer; the objective layer is the overall goal of the decision-making problem, the criterion layer is the criteria used to evaluate alternative solutions, and the solution layer is the alternative solution;

Construct a comparison matrix: constructing a comparison matrix by the paired comparisons of the importance of elements in the same level relative to a certain element in the previous level pairwise. The elements in the comparison matrix represent the ratio of the relative importance of two elements;

Hierarchical single ranking: based on the comparison matrix, calculating the relative importance ranking weight of elements in the same level relative to a certain element in the previous level. This process is called hierarchical single ranking;

Consistency check: checking the consistency of the comparison matrix, that is, checking whether the comparison matrix meets the consistency condition. If the consistency condition is met, the hierarchical single-ranking result is considered reasonable;

Hierarchical total ranking: calculating the composite weight of each level element on the system objective, performing total ranking to determine the total ranking weight of each element at the bottom level of the hierarchical structure graph;

Through the analytic hierarchy process, decision-makers can decompose complex decision-making problems into different levels and make decisions based on qualitative and quantitative analysis; this method can improve the accuracy and effectiveness of decision-making, especially for complex problems that are difficult to solve using quantitative methods.

The above embodiments can be fully or partially implemented through software, hardware, firmware, or any other combination. When implemented using software, the above embodiments can be fully or partially implemented in the form of a computer program product. The computer program product includes one or more computer instructions or computer programs. When loading or executing the computer instructions or programs on a computer, all or part of the processes or functions described in the embodiments of the present application are generated. The computer may be a general-purpose computer, a specialized computer, a computer network, or other programmable device. The computer instructions can be stored in computer-readable storage media or transmitted from one computer-readable storage medium to another. For example, the computer instructions can be transmitted from a website site, a computer, a server, or a data center to another website site, computer, server, or data center via wired (such as infrared, wireless, microwave, etc.) means. The computer-readable storage medium can be any available medium that a computer can access or a data storage device such as a server or data center that contains one or more sets of available media. The available media can be magnetic media (such as floppy disks, hard disks, magnetic tapes), optical media (such as DVDs), or semiconductor media. The semiconductor media can be solid-state disks.

Those of ordinary skill in the art can realize that the units and algorithm steps described in the embodiments disclosed in this article can be implemented through electronic hardware or a combination of computer software and electronic hardware. Whether these functions are executed in hardware or software depends on the specific application and design constraints of the technical solution. Professional technicians can use different methods to achieve the described functions for each specific application, but such implementation should not be considered beyond the scope of this application.

Those skilled in the art can clearly understand that for the convenience and simplicity of description, the specific working processes of the systems, devices, and units described above can refer to the corresponding processes in the aforementioned method embodiments, which will not be described here for brevity.

In the plurality of embodiments provided in this application, it should be understood that the disclosed systems, devices, and methods can be implemented in other ways. For example, the device embodiments described above are only illustrative. For example, the division of units is only a logical functional division. In practical implementation, there may be other division methods, such as multiple units or components being combined or integrated into another system, or some features being ignored or not executed. On the other hand, the mutual coupling or direct coupling, or communication connection displayed or discussed can be indirect coupling or communication connection through some interfaces, devices, or units, which can be electrical, mechanical, or other forms.

The units described as separate components may or may not be physically separated, and the components displayed as units may or may not be physical units, i.e. they can be located in one place or distributed across multiple network units. Some or all of the units can be selected according to actual needs to achieve the purpose of this embodiment.

In addition, each functional unit in each embodiment of the application can be integrated into one processing unit, or each unit can exist physically alone, or two or more units can be integrated into one unit.

If the functions are implemented in the form of software functional units and sold or used as independent products, they can be stored in a computer-readable storage medium. Based on this understanding, The essence of the technical scheme essentially or the part that contributes to the existing technology or the part of the technical scheme of the present application can be embodied in the form of a software product, which is stored in a storage medium and includes a plurality of instructions for a computer device (which can be a personal computer, server, or network device, etc.) to perform all or part of the steps of the methods described in various embodiments of the present application. The aforementioned storage media include various media that can store program code, such as USB flash drives, portable hard drives, read-only memory (ROM), random access memory (RAM), magnetic disks, or optical disks.

The above is only a specific implementation of the present application, but the scope of protection of the present application is not limited to this. Any skilled person familiar with the technical field can easily think of changes or replacements within the technical scope disclosed in the present application, which should be included in the scope of protection of the present application. Therefore, the scope of protection of this application should be based on the scope of protection of the claims.

The above is only a specific implementation of the present application, but the scope of protection of the present application is not limited to this. Any skilled person familiar with the technical field can easily think of changes or replacements within the technical scope disclosed in the present application, which should be included in the scope of protection of the present application.

The invention claimed is:

1. An intelligent irrigation control method for rice fields based on a cloud service platform, comprising:

periodically monitoring crop planting conditions in each sub-area of an irrigation area, constructing a planting condition data set, constructing a condition coefficient Fps of crop planting based on the planting condition data set, and issuing a warning instruction if the condition coefficient Fps of crop planting exceeds a state threshold;

after receiving the warning instruction, monitoring a current water supply environment of crops and constructing a water supply coefficient Hps, if the water supply coefficient is lower than a water supply threshold, installing an irrigation system in a planting area, and obtaining a crop growth digital twin model after training;

based on current growth data of crops, matching a plurality of irrigation strategies correspondingly from a pre-constructed crop irrigation knowledge graph, and selecting a targeted strategy from the plurality of irrigation strategies through a growth coefficient Bps constructed;

after implementing the target strategy in the irrigation area, periodically obtaining the water supply coefficient Hps and the growth coefficient Bps of crops during an observation period, then constructing an irrigation observation coefficient set, constructing an irrigation coefficient Pes based on the irrigation observation coefficient set, if the irrigation coefficient Pes is lower than an efficiency threshold, issuing an optimization instruction, wherein constructing the irrigation coefficient Pes based on the irrigation observation coefficient set is as follows:

$$Pes = k_1 * \max|Hps_i - Bps_i| + k_2 * \frac{1}{n} * \sum_{i=1}^{n} |Hps_i - Bps_i|;$$

wherein, $k_2$ and $k_1$ are weights, $0 \leq k_1 \leq 1$, $0 \leq k_2 \leq 1$, and $k_1 + k_2 = 1$, $Bps_i$ is the i-th growth coefficient, $Hps_i$ is the i-th water supply coefficient, $i=1, 2, \ldots n$, n is the number of observation nodes;

receiving an optimization instruction, using a trained strategy optimization model to optimize the target strategy to obtain an optimized target strategy, and controlling the irrigation coefficient based on the optimized target strategy to irrigate crops in the irrigation area;

dividing the irrigation area into a plurality of sub-areas, selecting an installation point within each sub-area, installing a detection unit at each installation point, and establishing a planting condition monitoring system within the irrigation area; dividing crop growth into a plurality of growth cycles, and setting up a plurality of monitoring nodes spaced equally within a current growth cycle of crops; at each monitoring node, monitoring the planting conditions in the sub-area through the planting condition monitoring system, and summarizing collected monitoring data to construct the planting condition data set;

obtaining the rainfall Rv, the temperature Rt, and the sunshine duration Rg in the irrigation area at each monitoring node from the planting condition data set, performing linear normalization on the above three, mapping the corresponding data values to an interval [0,1], and constructing the condition coefficient Fps of crop planting according to the following formula:

$$Fps = \alpha * \frac{Rv_{avg}(k-1)}{\sum_{i=1}^{k}(Rv_i - \overline{Rv})^2} + \beta * \frac{Rt_{avg}(k-1)}{\sum_{i=1}^{k}(Rt_i - \overline{Rt})^2} + \gamma * \frac{Rg_{avg}(k-1)}{\sum_{i=1}^{k}(Rg_i - \overline{Rg})^2};$$

weight coefficients: $0 \leq \beta \leq 1$, $0 \leq \alpha \leq 1$, $0 \leq \gamma \leq 1$, and $\alpha+\beta+\gamma=1$, i=1, 2, ..., k, k is the number of monitoring nodes, $Rv_{avg}$ is an average value of rainfall, $\overline{Rv}$ is a qualified standard value for rainfall, $Rt_{avg}$ is an average value of temperature, $\overline{Rt}$ is the qualified standard value for temperature, $Rg_{avg}$ is an average value of sunshine duration, and $\overline{Rg}$ is a qualified standard value for sunshine duration;

setting up a detection point in each sub-area to monitor the air humidity and the soil moisture content in each sub-area, and summarizing the monitoring data to construct a water supply condition set; constructing the water supply coefficient Hps from the water supply condition set is as follows: performing linear normalization on the air humidity Rp and the soil moisture content Tp, and mapping the corresponding data values to an interval [0, 1] according to the following formula:

$$Hps = 1 - \rho * \ln\left(\frac{1}{1+Rp^2}+1\right) - \zeta * \ln\left(\frac{1}{1+Tp^2}+1\right);$$

weight coefficient: $0 \leq \rho \leq 1$, $0 \leq \zeta \leq 1$; if the water supply coefficient Hps is lower than the water supply threshold, installing the irrigation system in the planting area;

after determining a type and a current growth stage of crops, taking crop irrigation and related keywords as search terms to construct a graph data set through deep search, and generating a crop irrigation knowledge graph after completing the entity relationship construction;

performing feature recognition on crops data and planting status data of crops to obtain data features correspondingly; after determining the irrigation requirements of crops, based on a correspondence between data features and irrigation strategies of crops, using a trained matching model to match a plurality of irrigation strategies correspondingly from the crop irrigation knowledge graph;

obtaining rainfall prediction information and combining it with the irrigation strategies obtained as an input, using the crop growth digital twin model to predict the growth status of crops, obtaining predicted growth data correspondingly, summarizing the predicted growth data to construct a predicted data set; constructing the growth coefficient Bps of crops based on the predicted data set, marking each of irrigation strategies based on the growth coefficient Bps obtained, and taking an irrigation strategy with the highest growth coefficient Bps as the target strategy, an irrigation strategy with a second-highest growth coefficient Bps as a backup strategy.

2. The intelligent irrigation control method for rice fields based on a cloud service platform according to claim 1, wherein
after obtaining the target strategy correspondingly, executing the target strategy within the current growth cycle of the crops, and after executing the target strategy, setting an observation period and there is a plurality of observation nodes within the observation period; monitoring the planting conditions before and after irrigation in the irrigation area at each of the observation nodes, and constructing the water supply coefficient Hps at each of the observation nodes; selecting a plurality of crop samples in each sub-area and constructing the growth coefficient Bps of crops correspondingly after measurement; summarizing the water supply coefficient Hps and growth coefficient Bps of crops at each of observation nodes to construct the irrigation observation coefficient set.

3. The intelligent irrigation control method for rice fields based on a cloud service platform according to claim 1, wherein
constructing and obtaining a trained strategy optimization model using linear programming algorithm; using the trained strategy optimization model and combining with current growth status data, growth environment data, and weather prediction data of crops to optimize the target strategy to obtain the optimized irrigation strategy; in a next observation cycle, executing the optimized irrigation strategy within the irrigation area to irrigate the crops in the irrigation area.

4. The intelligent irrigation control method for rice fields based on a cloud service platform according to claim 3, wherein
taking the optimized irrigation strategy as an input, using the crop growth digital twin model after training to predict the growth status of crops, and constructing the growth coefficient Bps of crops from the predicted values, if the growth coefficient Bps of crops obtained is lower than a progress threshold, issuing an alarm instruction.

5. An intelligent irrigation control system for rice fields using the control method described in claim 4, comprising:
a warning unit, configured to periodically monitor the crop planting conditions in each sub-area of the irrigation area to construct a planting condition data set, and construct the condition coefficient Fps of crop planting based on the planting condition data set, if the condition coefficient Fps of crop planting exceeds the state threshold, issuing a warning instruction;
an installation unit, configured to monitor the current water supply environment of crops and construct a water supply coefficient Hps after receiving the warning instruction, if the water supply coefficient Hps is lower than the water supply threshold, install an irrigation system in the planting area and train to obtain a crop growth digital twin model;
a screening unit, configured to match the plurality of irrigation strategies correspondingly from the pre-constructed crop irrigation knowledge graph based on the current growth data of crops, and select the target strategy from the plurality of irrigation strategies through the growth coefficient Bps constructed;
an analysis unit, configured to periodically obtain the water supply coefficient Hps and the growth coefficient Bps of crops during the observation period after implementing the target strategy in the irrigation area, then construct an irrigation observation coefficient set, and construct the irrigation coefficient Pes from the irrigation observation coefficient set, if the irrigation coefficient Pes is lower than the efficiency threshold, issuing an optimization instruction; and an optimization unit, configured to receive the optimization instruction, use the trained strategy optimization model to optimize the target strategy to obtain the optimized target strategy, and control the irrigation coefficient based on the optimized target strategy to complete the irrigation of crops in the irrigation area.

\* \* \* \* \*